United States Patent [19]
Finkbeiner

[11] 3,966,125
[45] June 29, 1976

[54] METHOD AND FACILITY FOR THE PRODUCTION OF RUBBER FLOURS AND/OR RUBBER GRANULES FROM VEHICLE TIES

[75] Inventor: Hanspeter Finkbeiner, Kundoldingen, Switzerland

[73] Assignee: Gezolan Engineering AG, Zolfingen, Switzerland

[22] Filed: Apr. 2, 1975

[21] Appl. No.: 564,558

[30] Foreign Application Priority Data
Apr. 3, 1974 Switzerland.......................... 4659/74

[52] U.S. Cl.................................. 241/14; 241/24; 241/29; 241/DIG. 31
[51] Int. Cl.² ........................................ B02C 23/10
[58] Field of Search .................. 241/14, 19, 24, 25, 241/29, DIG. 31

[56] References Cited
UNITED STATES PATENTS

| | | | |
|---|---|---|---|
| 419,464 | 1/1890 | Mitchell...................... | 241/DIG. 31 |
| 419,697 | 1/1890 | Mitchell...................... | 241/DIG. 31 |
| 816,735 | 4/1906 | Penther............................. | 241/14 X |
| 1,401,795 | 12/1921 | Kohler et al. ......................... | 241/19 |
| 2,126,672 | 8/1938 | Smith et al............................ | 241/19 |
| 2,136,099 | 11/1938 | Buxbaum.............................. | 241/14 |
| 2,462,645 | 2/1949 | Knowland............................. | 241/24 |
| 2,471,043 | 5/1949 | Schenck............................... | 241/14 |
| 3,384,309 | 5/1968 | Marshall............................... | 241/14 |

*Primary Examiner*—Granville Y. Custer, Jr.
*Attorney, Agent, or Firm*—James E. Nilles

[57] ABSTRACT

Old rubber tires from cars and trucks are first cut up by a coarse pregrinder into pieces of about 100 to 200 millimeter size. These cuttings are then comminuted in successive stages down to particle sizes of about 5 millimeters. For that purpose they are passed through grinding mills with fluted rollers which deform the particles so as to rupture and expose their textile components. The comminuted particles produced in the various stages are screened to separate metal containing from metal free particles. In subsequent screening and comminuting stages the metal free particles are further reduced to separate masses of graded rubber flour substantially free of metallic and fibrous tire components.

4 Claims, 1 Drawing Figure

U.S. Patent June 29, 1976 3,966,125
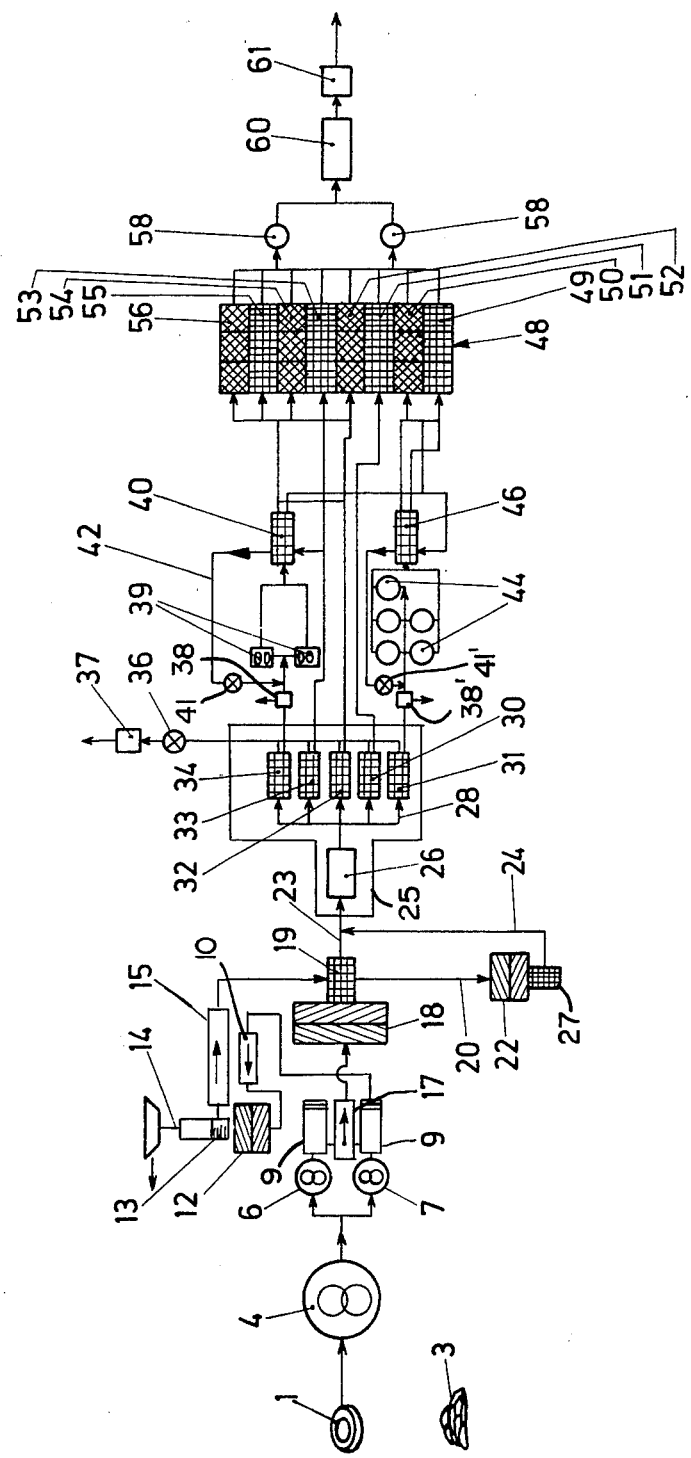

METHOD AND FACILITY FOR THE PRODUCTION OF RUBBER FLOURS AND/OR RUBBER GRANULES FROM VEHICLE TIES

BACKGROUND OF THE INVENTION

The present invention relates to a method and to a facility for the production of rubber flours and/or rubber granules from vehicle tires.

Most of the old tires here under consideration include textile inserts of nylon or rayon. Nowadays it is a problem to dispose of this old material as harmlessly as possible and to salvage it for possible reuse.

SUMMARY OF THE INVENTION

The object of the present invention is to provide a method of salvaging old rubber material for reuse. The characteristic features of the method according to the present invention are that the tires are completely or partly disintegrated into their constituent materials and separated, and that at least a number of these materials are saved for reuse.

DRAWING

The accompanying drawing shows a flow diagram of a facility for the production of rubber flours and/or rubber granules in accordance with the present invention.

DETAILED DESCRIPTION

As shown in the flow diagram, old tires 1 are separated from scrap rubber parts 3. This initial separation is absolutely necessary because there are scrap rubber parts which, because of their small size, nature, inserts and the like, do not have to be subjected to all the method steps to which old vehicle tires must be subjected. The tires are delivered into a first coarse pregrinder 4 and thereafter into two parallel coarse pregrinders 6 and 7. In the first coarse pregrinder 4 the scrap rubber parts, particularly in the form of old tires 1, are cut into pieces whose principal dimension measures between 100 and 200 millimeters. The upper limit, however, may be higher, for instance 250 millimeters. In the subsequent parallel coarse pregrinders 6 and 7 the pieces are reduced to a size whose principal dimension normally measures between 30 and 40 millimeters. Here again, the upper limit may be greater, for instance around 60 millimeters. Succeeding each of the coarse pregrinders 6 and 7 is a belt conveyor with a magnetic drum 9 which serves to separate metal containing rubber pieces from metal free rubber pieces. The metal containing pieces are removed and delivered to a conveying device 10 and from there they are delivered into a further pregrinder 12 with two fluted rollers. There they are further reduced in size and then separated by means of a magnetic drum and conveyor belt 13 into metal free and metal containing particles. This affords a very good efficiency and high rubber recovery. The metal containing residual particles are shunted out via a discharge duct 14 while the metal free rubber particles are conveyed via a transport device 15 into a screening device 19.

The metal free particles which emerge from the coarse pregrinders 6 and 7 are delivered through a transport device 17 into a first grinder 18 which is provided with two fluted rollers. The grinder 18 disintegrates the particles and, more specifically, it tears them to pieces because one of the fluted rollers rotates at a considerably slower speed than the other, for instance at the ratio of circumferential velocities of 1 to 3, so that the grasped particles are subjected to strong tensional stresses. As they are torn apart, textile inserts in the rubber, such as cord, become normally exposed. The screening apparatus 19 separates a coarser fraction, for instance with particle sizes between 5 and 10 millimeters, and delivers them via a duct 20 into a second fluted roller grinder 22 which is followed by a further screening apparatus 27 which separates particles up to 5 millimeters. The particles of up to 5 millimeter size pass from the screening apparatus 19 through a duct 23 which is joined by the duct 24 from the second grinder 22 and the adjoining screening apparatus, into a collecting chamber 26 of a screening apparatus 25. Stages 30, 31, 32, 33 and 34 of a vibratory screen assembly 28 within the screening apparatus 26 separate the material into particle sizes up to 1 millimeter, 1 to 2, 2 to 3, 3 to 4 and 4 to 5 millimeters. In these vibratory screening stages the lighter textile components segregate and precipitate upon a layer of rubber particles. Due to the fractionated separation, not only the rubber particles but also the textile particles are classified so that it becomes possible by means of a pneumatic transport device 36 to blow the lighter textile particles from the heavier rubber particles without entraining a noticeable amount of the rubber particles. The textile particles pass into a container 37 from which they are removed. In the facility as shown by the flow chart the coarsest fraction of 4 to 5 millimeters is once more passed into an inductive metal search device 38 in order to catch any stray metal particles. The coarsest fraction is then passed into two cutter-type granulators 39 which are succeeded by a screening apparatus 40. The insufficiently reduced particles are returned via a return passage 42 to the inlet of the cutter-type granulators 39. One of the finer fractions, in the illustrated embodiment the fraction of 1 to 2 millimeter size, is likewise distributed over five tooth-type disc grinders 44 after they have passed through an inductive metal search device 38'. The grinders 44 comminute the material further by friction due to differential speeds of the grinding discs. Subsequently, the particles pass into a further screening apparatus 46 from which the coarser particles are recycled into the tooth-type disc grinders 44.

In accordance with existing requirements, the individual particle sized fractions are mixed within a screening and mixing apparatus 48 in graphically predetermined weight proportions and they are then bagged in bagging stations 58. As shown in the flow diagram, the screening apparatus 48 is provided with screens 49 through 56. The bagging stations 58 are succeeded by an automatic palletizing and shrinking apparatus 60 and 61.

One of the principal difficulties resides in the separation of the rubber from textile threads and fabrics such as are encountered particularly with old tires.

Basically, the described process may be divided into three phases, namely a material preparation phase which is followed by a phase of separating the individual material components and by a final processing phase.

Automobile tires are large volume, space consuming articles which are composed of rubber, steel and textile fabrics. Depending on the placement and construction of the individual components their weight proportions vary as well as the chemical composition of the materials. Consequently, distinctions must be made as follows:

Truck Tires — These are made primarily of natural rubber or a mixture of natural and synthetic rubber.

Passenger Car Tires — These are made mainly of synthetic rubber. Truck tires as well as passenger car tires may be produced as textile ply tires.

Formerly the basic material for the carcass has been predominantly rayon, but nowadays nylon fibers predominate. These are first processed into cord (one stage thread) and subsequently into fabrics. The steel within the tire is confined to the beads.

Textile Ply Tires — As the strengthening element of these tires a ply of textile material is arranged below the running surface.

Steel Ply Tires — As distinguished from textile ply tires, the basic material for the strengthening layer consists in this case of steel wire below the running surface.

Steel Belted Tires — In these tires the metal within the beads is supplemented by metal under the running surface. Instead of textile materials, steel wires are used in this instance for the carcass production. Consequently, metal is present all over the tire. Considering that for different applications only certain rubber qualities can be used and that these different qualities have different behavior characteristics during processing, it is necessary that the scrap material must be stored and processed separately according to rubber qualities. Preferably the scrap material should be divided up into the following groups: truck tire material and passenger car tire material.

In the event that larger quantities of technical waste materials are also involved, the storage space would have to be enlarged in accordance with the corresponding material qualities. In order to store and transport the tires economically they must first be initially reduced to small hand plate size pieces of principal dimensions measuring between 100 to 250 millimeters and preferably less than 200 millimeters. This is accomplished by means of the coarse pregrinder 4. Since the storage space for the raw material must for economical reasons be located out of doors, such initial reduction should be performed with a minimum of fine waste so that the environment will not be contaminated by the development of dust at high winds or through washing away of the dust during rains. For this reason it is desirable to use cutter-type pregrinders. Commercially available sturdy waste mills are very well adapted for that purpose.

The initially reduced material must then be subjected to further preparatory treatments. Since the metal of the most common textile ply tires is not distributed as in the steel belted tires over the entire cross section of the tire but is confined to two ranges, namely the beads, it is possible to separate the entire tire material during the preparatory treatment of textile ply tires into metal containing and non-metal containing cuttings before the actual material separating phase. The smaller the cuttings are, the easier it is to separate out the metal. For that reason the hand plate size pieces of material are used within the coarse pregrinders to produce cuttings of about 30 × 30 or 40 × 40 or 60 × 60 millimeter size. Subsequently, these cuttings are sorted into steel containing and steel free cuttings. The separating criterion is afforded by the positive or neutral behavior of the cuttings with respect to a magnetic field. This initial material preparation becomes necessary for two reasons. The steel wire which is used for the beads of passenger car tires has a diameter of about 1 millimeter and for truck tires a diameter of up to about 4 millimeters. These hard and heavy wires may cause chipping of the fluted rollers of the succeeding pregrinders 12. Such damaged fluted rollers cannot readily be reworked by grinding, in contrast to rollers which have become worn normally (small roundings of the ridges). If the metal containing material is separated out and passed over a separate apparatus assembly 12, 13, it becomes possible to increase the life of the rollers of the second grinder 22 which operate on metal free cuttings by simply regrinding these rollers. A further reason is the requirement that, in order to make optimal use of the production capacity, the succeeding apparatus should be supplied with particles of the smallest possible size. As previously mentioned, the principal object is to produce rubber flour or rubber granules from old tires. Since the material components of the old tires are not in a loose condition but are tightly joined together, it is necessary that they must be separated from each other before a proper sorting of the material can be accomplished.

The separating and sorting must be based in a mechanical process such as the present, upon physical differences between the materials to be separated. In the present instance the separation of the different materials is based upon the different stretch characteristics of steel, rubber and textile materials. The tire cuttings become subject to external forces due to the different circumferential velocities of the fluted rollers of the grinders 18 and 12, and as a result they are so strongly deformed that their component materials are relatively displaced at their junctions, and by reason of the different stretch characteristics of the materials separating forces therebetween will overcome their binding forces. At the same time a further comminution takes place because the tensions created by the deformation are in part higher than the rupture tensions of the individual materials (rubber and textiles).

The sorting between rubber and textile particles is based in the present instance upon the different geometrical shape as well as upon density differences of the individual particles. In the first place, the metal free material is separated according to granule size in the screening apparatus 25. The textile fabric is presented after the separation process in the form of cord pieces having a length of about 5 to 15 millimeters. These are hardly able, due to their length, to pass through the small screen meshes so that the relatively light cord pieces are screened out together with the heavier rubber granules. Subsequently, the individual screened out fractions are exposed to an oscillating feed within the oscillating feed screen 28 with the result that the light cord pieces accumulate on the surface of the advancing stream of rubber particles and can be removed by air suction or air blast.

It has been found that the operations which are necessary for the separation may be performed in a most economical manner by means of roller type grinders which are commercially available. As stated, the rollers must be fluted and they must be driven at different circumferential velocities. The heat which is generated by the deformation of the treated material may largely be dissipated by cooling of the rollers. If, due to heavy rainfalls or winter conditions, the old tire material is very damp the humidity can be removed by reduced cooling of the rollers.

After the material has been disintegrated it is passed over conveying chute 30-34 of the oscillating screen type conveying device. These conveying chutes have bottom screens and the material passing thereover is separated into granule sizes of 0-1, 1-2, 2-3, 3-4 and 5-10 millimeter size. At the ends of the conveying chutes the free cord pieces are withdrawn by the pneumatic transport device 36. Experience has shown that granules of less than 5 millimeter size are practically free from textile inclusions and material of a granule size greater than 5 millimeters is accordingly reduced to that size by means of further disintegrating equipment, not shown. At the end of the material separating phase the following materials are therefore on hand:

A — rubber flour of 0-1 millimeter size mixed with loose textile fibers;

B — pure rubber granules of 1-5 millimeter size.

Depending on the intended use of the rubber granules or rubber flours, certain requirements must be met regarding the granule size and structure. For that reason it is necessary that, after the separating and sorting operations, the material be given a final shape and granule composition.

For the economical production of granules two possibilities are available. The granulating in smaller roller type grinders or in tooth-type disc grinders, both based upon the hereinbefore mentioned disintegrating principle. This procedure is suitable for material with and without textile fabrics. Since the separation is caused by rupture of the material the surface is not smooth but jagged. For the production of pure rubber material as, for instance, for playgrounds and sport arenas, it is advisable to utilize grinders which operate on the principle of disintegration by cutting. In that manner it is possible to produce granulates of high quality with smooth surfaces and to effect a considerable saving of binding materials during the further operations. If material with textile inserts is to be processed according to the cutting principle broom-like bristles of the individual textile fibers occur at the cutting faces. This has the result that the entire textile material forms sort-of a mat which makes further processing difficult. In this connection it should be mentioned that all of these disintegrating operations require temperature control. In actual practice it has been observed that at temperatures above 90° C. (measured at the apparatus discharge) a depolymerizing effect occurs at the granule surface. With the start of this effect a sudden temperature rise occurs which causes the materials to stick together and as a result of the increased friction the machines may catch fire. Moreover, such material can no longer be further processed because it has become gummed up into large lumps. For that reason the material supply is automatically interrupted immediately upon the occurrence of a temperature rise. The entire material is further checked as to the presence of metal particles by means of inductive metal separators before it is fed into the granulators 39. If metal particles should be present they will be removed automatically. This method has the advantage over magnetic particle removers that it will also remove nonferrous metals and therefore afford an optimal protection for the processing apparatus.

For the production of flours the disc type mills 44 are used in the present method. Because small particles have increased friction and therefore also produce elevated temperatures the mentioned depolymerizing effect would occur during normal operation. An essential feature of the method is the concept that the admixture of friction reducing powder-like chemicals, for instance talc powder, will impede the temperature rise and improve the flow characteristics. Only in that manner is it possible to produce fine rubber flour. Moreover, load controlled apparatus for the production of rubber flour are also controlled as to temperature. Here again, the entire material is checked as to the presence of metal particles before processing, in a manner analogous to that used for the production of granulates.

The described method affords the possibility to salvage technical scrap of the rubber industry and scrap of the rubber coating industry and also old automotive vehicle tires irrespective of the construction and material composition, and to transform them in great quantities into granulates and flours. Due to the great variety of the resulting products (pure and fiber containing flours, pure granulates, granulates with textile occlusions as well as granulates with textile and loose cord occlusions) the salvaged tire material may be applied to widely different fields of use. In this manner the problem of disposing of old tire material in large quantities may be taken care of satisfactorily from the standpoint of environment contamination. The production components of the facility operate on a mechanical, electromechanical and pneumatic basis. For that reason the environment is not contaminated in any way as distinguished from other environment contaminating tire disposal methods such as burning, depositing, etc.

SUMMARY

The herein disclosed invention resides in an improved method of recovering rubber from worn automobile tires which comprises the following sequence of steps.

Initially cutting the tires to pieces by first pregrinding means such as the coarse pregrinder 4.

Subsequently recutting said tire pieces by second regrinding means, such as the coarse pregrinders 6 and 7, independent of the first pregrinding means.

Segregating the recut tire pieces into metal containing and substantially metal free pieces, as by the belt conveyors and associated magnetic drums 9.

Comminuting the metal containing and the metal free pieces independently of each other into reduced size metal containing and reduced size metal free pieces, as by the pregrinder 12 and the grinder 18.

Segregating the reduced size metal free pieces into a mass of relatively large size particles and into a first mass of relatively small size particles as by the magnetic drum and conveyor belt assembly 13 and by the screening device 19.

Comminuting the relatively large size particles into a second mass of relatively small size particles as by the grinder 22.

Finally comminuting said first and second masses of relatively small size particles into graded masses of rubber flour as by the screening apparatus 25 and subsequent disintegrating and screening equipment comprising the cutter-type granulators 39, tooth type disc grinders 44 and screening and mixing apparatus 48.

The step of comminuting the first and second masses of small size particles is supplemented by removal of textile tire components therefrom as by the pneumatic transport device 36. Furthermore, the step of comminuting the first and second masses of small size particles is supplemented by removal of residual metallic tire components therefrom as by the inductive metal searching devices 38 and 38'.

I claim:

1. The method of recovering rubber from worn automobile tires which comprises the steps of:

initially cutting the tires to pieces by first pregrinding means;

subsequently recutting said pieces by second pregrinding means independent of said first pregrinding means;

segregating said recut pieces into metal containing and substantially metal free pieces;

comminuting said metal containing and said metal free pieces independently of each other into reduced size metal containing and into reduced size metal free pieces;

segregating said reduced size metal free pieces into a mass of relatively large size particles and into a first mass of relatively small size particles;

comminuting said relatively large size particles into a second mass of relatively small size particles; and comminuting said first and second masses of relatively small size particles into graded masses of rubber flour.

2. The method set forth by claim 1 wherein quantities of said initially cut tire pieces are separately recut by pairs of cooperating fluted cutting rollers.

3. The method set forth by claim 1 wherein the step of comminuting said first and second masses of small size particles is supplemented by removal of textile tire components therefrom.

4. The method set forth by claim 3 wherein said step of comminuting said first and second masses of small size particles is further supplemented by removal of residual metallic tire components therefrom.

* * * * *